United States Patent
Zea

(10) Patent No.: US 8,320,558 B1
(45) Date of Patent: Nov. 27, 2012

(54) ENCRYPTION OF SYNCHRONIZATION INFORMATION

(75) Inventor: Nicolas Zea, Seattle, WA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/367,297

(22) Filed: Feb. 6, 2012

Related U.S. Application Data

(60) Provisional application No. 61/581,553, filed on Dec. 29, 2011.

(51) Int. Cl.
*H04L 29/06* (2006.01)
*H04K 1/00* (2006.01)
*H04L 9/00* (2006.01)
*H04L 9/28* (2006.01)
*H04L 9/08* (2006.01)

(52) U.S. Cl. .......... 380/28; 380/278; 713/153; 713/160; 713/168; 726/15; 726/22; 726/26

(58) Field of Classification Search .................. None
See application file for complete search history.

(56) References Cited

U.S. PATENT DOCUMENTS

| 8,001,082 | B1 * | 8/2011 | Muratov ..................... 707/634 |
| 2007/0258595 | A1 * | 11/2007 | Choy ......................... 380/278 |
| 2008/0091763 | A1 * | 4/2008 | Devonshire et al. ......... 709/201 |
| 2008/0134316 | A1 * | 6/2008 | Devonshire et al. ........... 726/15 |
| 2010/0198944 | A1 * | 8/2010 | Ho et al. ..................... 709/217 |
| 2010/0211782 | A1 * | 8/2010 | Auradkar et al. ............ 713/168 |
| 2011/0246766 | A1 * | 10/2011 | Orsini et al. ................ 713/160 |
| 2011/0252236 | A1 * | 10/2011 | De Atley et al. ............. 713/168 |
| 2011/0264907 | A1 * | 10/2011 | Betz et al. .................... 713/153 |
| 2012/0066769 | A1 * | 3/2012 | Latchem et al. .............. 726/26 |
| 2012/0072985 | A1 * | 3/2012 | Davne et al. .................. 726/22 |

* cited by examiner

*Primary Examiner* — Shin-Hon Chen
(74) *Attorney, Agent, or Firm* — McDermott Will & Emery LLP

(57) ABSTRACT

A computer-implemented method for synchronizing encryption of information is disclosed according to one aspect of the subject technology. The method comprises receiving a selection of one or more types of information by a user, wherein the one or more types of information are synchronized across a plurality of computing devices. The method also comprises generating an encryption status indicating that the one or more types of information selected by the user are to be encrypted, and sending the encryption status from a first one of the computing devices to a server, wherein the server distributes the encryption status to each of the other computing devices.

17 Claims, 4 Drawing Sheets

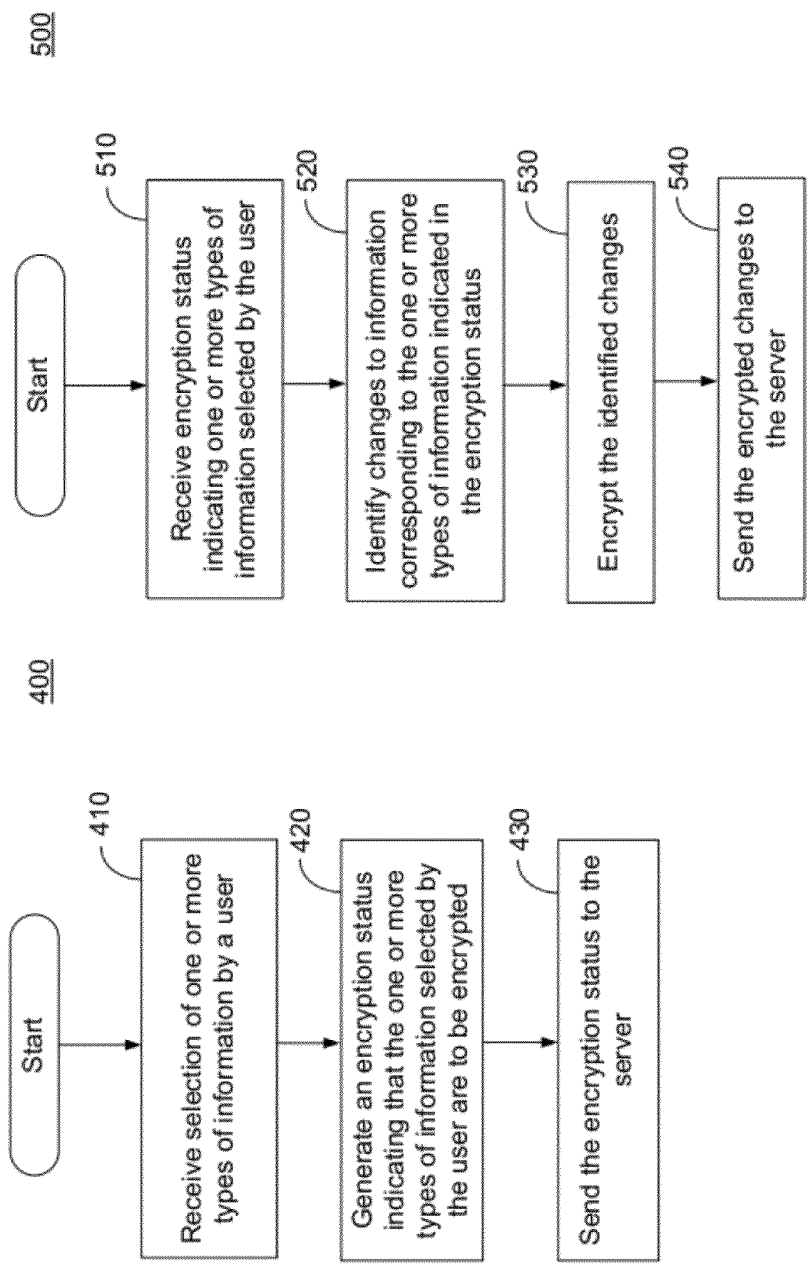

ENCRYPTION OF SYNCHRONIZATION INFORMATION

CROSS-REFERENCE TO RELATED APPLICATION

The present application claims the benefit of U.S. Provisional Patent Application Ser. No. 61/581,553, entitled "Encryption Of Synchronization Information," filed on Dec. 29, 2011, which is hereby incorporated by reference in its entirety for all purposes.

FIELD

The subject disclosure generally relates to computing devices, and, in particular, to encrypting information that is synchronized across multiple computing devices.

BACKGROUND

Information pertaining to a computer application (e.g., web browser) may be synchronized across multiple computing devices that are used by a user. For example, a local copy of the information may be stored at each computing device. When the user works on one of the computing devices, the user may make local changes to the information at the computing device. To maintain synchronization among the computing devices, the computing device may send an update with the changes to a server. The server may store the update in a user account and send the update to the other computing devices. Upon receiving the update from the server, each of the other computing devices may update its local copy of the information accordingly. As a result, changes made to the information at one computing device are reflected at the other computing devices.

SUMMARY

A computer-implemented method for synchronizing encryption of information is disclosed according to one aspect of the subject technology. The method comprises receiving a selection of one or more types of information by a user, wherein the one or more types of information are synchronized across a plurality of computing devices. The method also comprises generating an encryption status indicating that the one or more types of information selected by the user are to be encrypted, and sending the encryption status from a first one of the computing devices to a server, wherein the server distributes the encryption status to each of the other computing devices.

A machine-readable medium comprising instructions stored therein is disclosed according to an aspect of the subject technology. The instructions, when executed by a machine, cause the machine to perform operations for encrypting information. The operations comprise receiving an encryption status at a first computing device, wherein the encryption status indicates one or more types of information selected by a user at a second computing device, and the one or more types of information are synchronized across the first and second computing devices. The method also comprises identifying changes to information at the first computing device corresponding to the one or more types of information indicated in the encryption status, encrypting the identified changes, and sending the encrypted changes from the first computing device to a server, wherein the server sends the encrypted changes to the second computing device.

A system for encrypting information is disclosed according to an aspect of the subject technology. The system comprises one or more processors, and a machine-readable medium comprising instructions stored therein, which when executed by the one or more processors, cause the one or more processors to perform operations. The operations comprise receiving an encryption status at a first computing device, wherein the encryption status indicates one or more types of information selected by a user at a second computing device, and the one or more types of information are synchronized across the first and second computing devices. The operations also comprise receiving changes to information at the first computing device, determining whether the changes correspond to the one or more types of information indicated in the encryption status, and if the changes correspond to the one or more types of information indicated in the encryption status, then performing steps. The steps comprise encrypting the changes with a cryptographic key, and sending the encrypted changes from the first computing device to the server, wherein the server sends the encrypted changes to the second computing device.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

Certain features of the subject technology are set forth in the appended claims. However, for purpose of explanation, several embodiments of the subject technology are set forth in the following figures.

FIG. 4 shows a method for synchronizing encryption of information across multiple computing devices according to an aspect of the subject technology.

FIG. 5 shows a method for synchronizing encryption of information across multiple computing devices according to another aspect of the subject technology.

DETAILED DESCRIPTION

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and may be practiced without these specific details. In some instances, well-known structures and components are shown in block diagram form in order to avoid obscuring the concepts of the subject technology.

Information pertaining to a computer application (e.g., a web browser) may be synchronized across multiple computing devices that are used by a user. For example, a local copy of the information may be stored at each computing device. When the user works on one of the computing devices, the user may make local changes to the information at the computing device. To maintain synchronization among the computing devices, the computing device may send an update with the changes to a server. The server may store the update in a user account and send the update to the other computing devices so that each of the other computing devices may update its local copy of the information accordingly. As a result, changes made to the information at one computing device are reflected at the other computing devices.

For security reasons, the user may desire to protect sensitive information (e.g., password) that is synchronized across multiple computing devices.

To address this need, the subject technology provides systems and methods that allow a user to select certain types of information for encryption at one of the computing devices. After the user makes his/her selection, the computing device generates an encryption status specifying types of information to be encrypted based on the user's selection. The computing device then sends the encryption status to a server. The server may store the encryption status in a user account and send the encryption status to the other computing devices. Upon receiving the encryption status from the server, each of the other computing devices may encrypt and decrypt information in accordance with the encryption status.

Various aspects of the subject technology will now be described using an example of browser information. However, it should be appreciated that the subject technology is not limited to this example, and that the subject technology may be used to synchronize any type of information across multiple computing devices.

Figure 1:
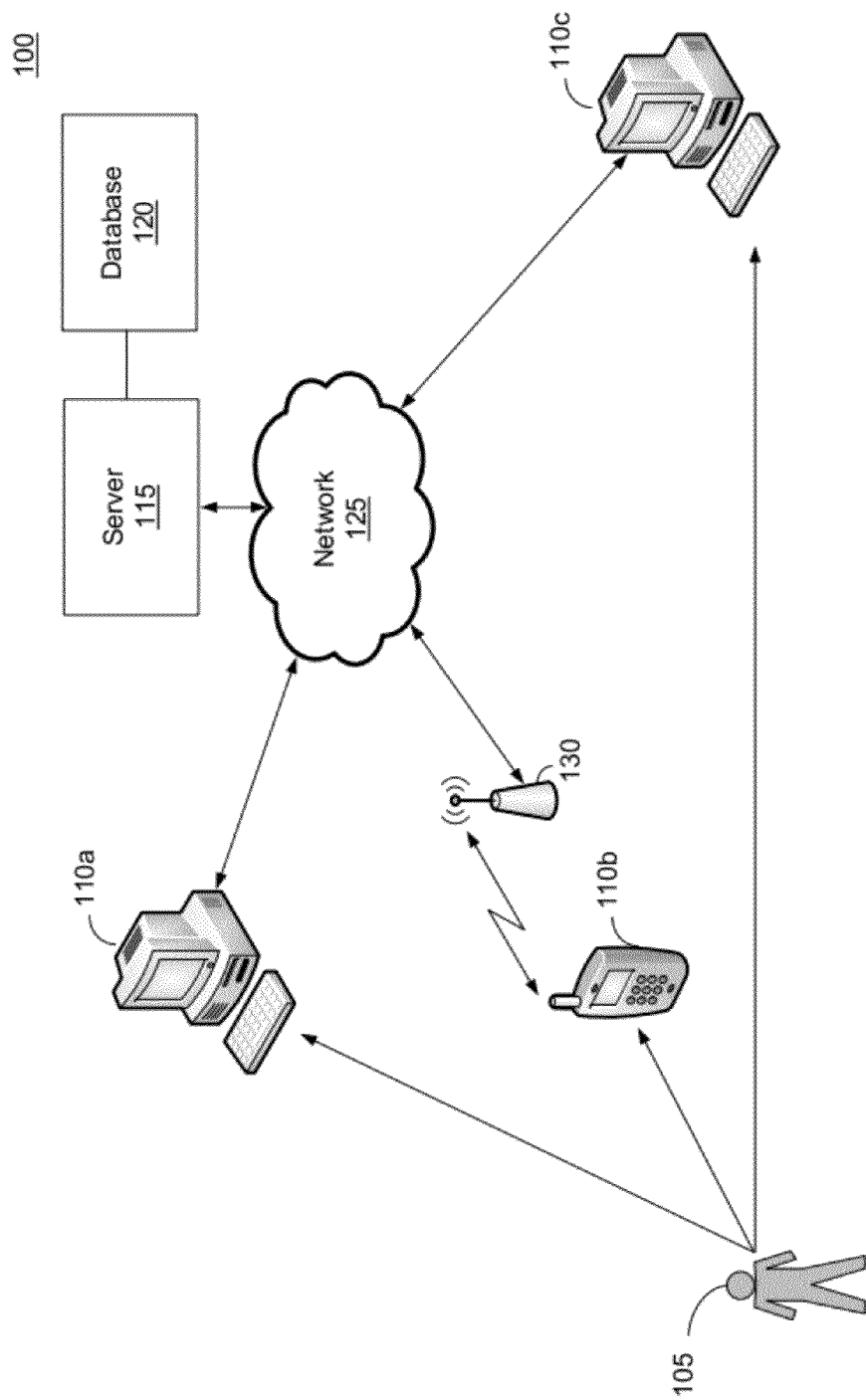
FIG. 1 is a conceptual block diagram of a system for synchronizing information across multiple computing devices according to an aspect of the subject technology.

FIG. 1 shows a system 100 for synchronizing browser information across multiple computing devices according to an aspect of the subject technology. The system 100 may comprise multiple computing devices 110a-110c, a synchronization server 115 and a database 120. Each computing device 110a-110c may be a laptop computer, a desktop computer, a tablet, a smart phone, a personal digital assistant (PDA), or other type of computing device. Each computing device 110a-110c may communicate with the server 115 over a network 125, for example, a local area network (LAN), a wide area network (WAN), an intranet and/or the Internet. In one aspect, one or more of the computing devices 110b may communicate with the network 125 via a wireless link (e.g., a WiFi wireless link, a cellular wireless link, etc.) with a base station or a wireless access point 130 connected to the network 125. While the system 100 is shown in one exemplary configuration in FIG. 1, it is to be understood that the system 100 may include additional or fewer computing devices.

In one aspect, each computing device 110a-110c may be configured to load and execute a web browser that allows a user 105 to retrieve and view web content from the network 125 (e.g., the Internet). Each computing device 110a-110c may store a local copy of browser information in a respective local memory. The browser information may comprise configuration and setting information for the web browser, browser history, and other information pertaining to the web browser. Examples of different types of browser information that may be used according to various aspects of the subject technology are provided below.

The browser information may include the user's browser preferences. The user's browser preference's may specify the home web page that is displayed in the browser window at startup. The user's browser preference's may also specify user selected browser settings.

The browser information may also include bookmarks for providing shortcuts to the user's favorite web pages. The user 105 may edit the bookmarks by adding and/or removing web pages from the bookmarks. For example, the user may add a new bookmark entry (new web page) to the bookmarks by clicking on an icon (e.g., a star icon) when the web page is displayed in the browser window and/or the URL of the web page is in the address bar.

The browser information may also include a browser history listing the web addresses (e.g., URLs) of web sites visited by the user during one or more browser sessions. The browser information may also include a list of URLs typed into the address bar by the user.

The browser information may also include tab information specifying web pages that are currently opened on the web browser. In this example, the web browser may include a tab bar with one or more tabs, where each tab represents a web page that is opened on the web browser. The tab bar allows the user 105 to navigate between multiple web pages that are opened on the web browser. For example, the user 105 may view a particular one of the web pages by clicking on the corresponding tab. The tab information may include the web address (e.g., URL) of each web page that is opened on the web browser. The tab information may be updated when the user opens or closes a tab.

The browser information may also include theme information specifying a theme of the web browser. The theme allows the user 105 to customize the look of the web browser. For example, the theme information may specify one or more user selected colors for the toolbar and frame of the web browser, and a user selected image for the background of the browser window.

The browser information may also specify one or more applications that are installed on the respective computing device 110a-110c. An application may be a web-based application that can be used within the web browser (e.g., to play a video from a web site). The browser information may also include one or more software extensions, each of which may comprise program code that adds additional functionalities to the web browser.

The browser information may also include password information for one or more web sites visited by the user 105. When the user 105 logs into a web site using a user name and a password, the web browser may store the user name and the password for future use. The user name may comprise a user email address. On subsequent visits to the web site, the web browser may automatically enter the stored user name and password so that the user does not have to reenter the user name and password each time the user visits the web site.

The browser information may also include autofill data. For example, when the user 105 enters information (e.g., name, address, phone number, etc.) into a web form, the web browser may store the entered information as autofill data. When the user 105 has to subsequently fill similar information (e.g., name, address, phone number, etc.) in the same web form or other web form, the web browser may automatically fill in some or all of the information in the web form using the stored autofill data. The autofill data may include the user's name, address, phone number, credit card information, and/or other types of information. For the example of credit card information (e.g., credit card number, expiration date, billing address, etc.) the browser may request permission from the user before storing the credit card information as autofill data.

It should be appreciated that the subject technology is not limited to the exemplary browser information given above, and that other types of browser information may also be used in addition to or in the alternative to the exemplary browser information given above.

In one aspect, the server 115 is configured to synchronize browser information across the computing devices 110a-110c. The user 105 may use different ones of the computing devices 110a-110c for web browsing at different times. For example, the user 105 may use computing device 110a (e.g., a desktop or laptop computer) for web browsing at work and/or home, and use computing device 110b (e.g., a smart phone or tablet) for web browsing on the go. By synchronizing browser information across the computing devices 110a-110c, the user's browser information (e.g., browser preferences, theme, bookmarks, browser history, etc.) is available on anyone of the computing devices 110a-110c.

Each computing device 110a-110c may connect to the server 115 over the network 125. For example, the user 105 may connect a computing device 110a-110c to the server 115 by logging onto the server 115 from the computing device 110a-110c. To do this, the user 105 may enter user credentials (e.g., user name, password, etc.) at the computing device 110a-110c and the computing device 110a-110c may send the user credentials to the server 115 over the network 125. If the server 115 authenticates the user based on the received user credentials, then the server 115 may grant the computing device 110a-110c access to a user account stored on the database 120. As discussed further below, a copy of the user's browser information may be stored in the user account to synchronize the computing devices 110a-110c. The user 105 may connect multiple computing devices 110a-110c to the server 115 at a time, for example, by logging onto the server 115 from each of the computing devices 110a-110c.

To establish initial synchronization among the computing devices 110a-110c, the user 105 may enable synchronization at computing device 110a, for example, by enabling a synchronization setting on the web browser. The user 105 may then log computing device 110a onto the user account at the server, for example, by entering user credentials at computing device 110a.

Upon successful login, computing device 110a may inform the server 115 that synchronization has been enabled. Computing device 110a may then send the browser information stored locally at computing device 110a to the server 115 over the network 125.

In one aspect, the user 105 may specify which types of browser information are to be synchronized across the computing devices 110a-110c. For example, when the user 105 enables synchronization at computing device 110a, computing device 110a may display a list of different types of information. The user can choose to synchronize all browser information or select different types of information individually, for example, by checking a box next to each desired type of information in a list.

If the user 105 selects certain types of information for synchronization, then computing device 110a may only send browser information to the server 115 corresponding to the information types selected by the user 105. Computing device 110a may also inform the server 115 of the types of information selected by the user 105 so that only the types of information selected by the user 105 are synchronized across the computing devices 110a-110c.

Upon receiving the browser information from computing device 110a, the server 115 may store the received browser information in the user account on the database 120. The browser information stored in the user account may be referred to as synchronization information or data.

When the user logs onto the server 115 from computing device 110b and enables synchronization at computing device 110b, the server 115 may send the browser information stored in the user account to computing device 110b over the network 125. When computing device 110b receives the browser information from the server 115, computing device 110b executes a synchronization process.

First, the computing device 110b may compare the received browser information with browser information stored locally at computing device 110b. If the received browser information includes information (e.g., bookmark entries, autofill data, etc.) that is missing from the local browser information of computing device 110b, then computing device 110b may update the local browser information to include the missing information. If the local browser information of computing device 110b includes information (e.g., bookmark entries, autofill data, etc.) that is missing from the received browser information, then computing device 110b may push the missing information to the server 115. In this case, the server 115 may update the browser information (synchronization information) in the user account with the missing information and push the missing information to computing device 110a so that computing device 110a can update its local browser information accordingly.

If some of the received browser information conflicts with some of the local browser information at computing device 110b, then computing device 110b may resolve the conflict according to a conflict-resolution policy. For example, each entry (e.g., bookmark entry, autofill data entry, theme, etc.) in the received browser information and the local browser information may be time stamped with the date that the entry was created and/or last modified. In this example, when a entry in the received browser information conflicts with an entry in the local browser information, computing device 110b may resolve the conflict in favor of the entry that was most recently created or modified. If the entry in the received browser information wins the conflict, then computing device 110b may replace the entry in the local browser information with the received entry. If the entry in the local browser information wins the conflict, then computing device 110b may push the entry in the local browser information to the server 110b with instructions to replace the corresponding entry in the user account with the entry from computing device 110b. In this case, the server 115 may push the entry from computing device 110b to computing device 110a. It should be appreciated that the subject technology is not limited to the exemplary conflict-resolution policy discussed above and that other types of conflict-resolution policies may be adopted.

As a result of the synchronization process, the browser information at computing devices 110a and 110b and the browser information (synchronization information) in the user account are synchronized with one another. The process described above may be repeated for each additional computing device that the user 105 desires to synchronize with the user account.

After the computing devices 110a-110c are initially synchronized, the server 115 may maintain synchronization among the computing devices 110a-110c. When the user 105 makes local changes to the browser information (e.g., the user adds and/or deletes one or more bookmark entries) at any one of the computing devices 110a-110c, the computing device may send an update with the changes to the server 115. The server 115 may then update the browser information (synchronization information) stored in the user account based on the received update. As a result, the browser information stored in the user account is synchronized with the changes. The server 115 may then distribute the update with the changes to each of the other computing devices 110a-110c so that each of the other computing devices can update its local browser information accordingly.

For the example in which the user 105 only selects a subset of browser information for synchronization, only the subset selected by the user 105 may be synchronized across the computing devices 110a-110c. For example, if the user 105 selects the bookmarks for synchronization, but not the theme, then the bookmarks may be synchronized across the computing devices 110a-110c while each computing device 110a-110c may have a different theme. When the user 105 selects a subset of browser information for synchronization at one of the computing device 110a-110c, the server 115 may inform the other computing devices 110a-110c of the user's selection so that the other computing devices 110a-110c only send updates for the user selected subset of browser information.

Each computing device 110a-110c may include security settings specifying which types of browser information are to be encrypted. For example, when the user 105 makes local changes to the browser information at one of the computing devices 110a-110c, the computing device 110a-110c may determine whether the changes correspond to one or more types of information that are to be encrypted according to the security settings. If so, then the computing device 110a-110c encrypts an update with the changes and sends the encrypted update to the server 115.

The server 115 may store the encrypted update in a user account on the database 120 and send the encrypted update to the other computing devices 110a-110c. Upon receiving the encrypted update, each of the other computing devices 110a-110c may decrypt the encrypted update, and update its local copy of the browser information according to the changes in the decrypted update.

In one aspect, each of the computing devices 110a-110c may be configured to decrypt updates that are encrypted by anyone of the other computing devices 110a-110c. For example, each computing device 110a-110c may store the same cryptographic key in local memory and use its local copy of the cryptographic key for encrypting and decrypting updates. The cryptographic key may be generated based on the user's login information and/or a user-provided passphrase, as discussed further below.

Encrypting an update protects sensitive information (e.g., passwords) in the update from hackers. This is because, even if a hacker manages to intercept the update (e.g., from an unprotected public network), the hacker will not be able to decrypt the update, and therefore will not be able to gain useful information from the update. An encrypted update may be stored in the user account at the server 115 in encrypted form for added security.

In one aspect, the security settings of the computing devices 110a-110c may be synchronized. When the user 105 modifies the security settings at one of the computing devices 110a-110c by selecting certain types of browser information for encryption, the computing device 110a-110c generates an encryption status specifying the types of information selected by the user 105 for encryption. The computing device 110a-110c then sends the encryption status to the server 115. The server 115 may store the encryption status in the user account and send the encryption status to the other computing devices 110a-110c. Upon receiving the encryption status from the server 115, each of the other computing devices 110a-110c may update its security settings according to the received encryption status.

Thus, when the user selects certain types of information for encryption at one of the computing devices 110a-110c, the other computing devices 110a-110c synchronize their security settings according to the user's selection. As a result, each computing device 110a-110c encrypts updates to the server 115 and decrypts updates from the server 115 according to the user's selection.

Figure 2:
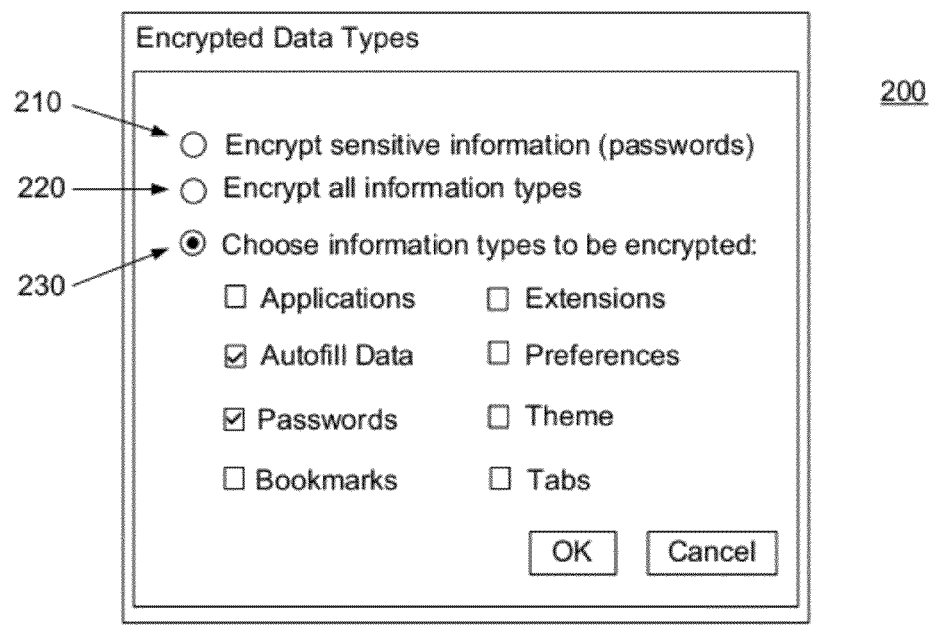
FIG. 2 is an exemplary screenshot showing a menu for selecting types of information to be encrypted according to an aspect of the subject technology.

FIG. 2 shows a screenshot of an exemplary menu 200 for allowing a user to select certain types of synchronization information for encryption according to an aspect of the subject technology. The menu 200 may be displayed at anyone of the computing devices 110a-110c. The menu 200 may drop down from the browser tool bar or may be displayed within the browser window as a new tab (e.g., when the user selects a security setting option from the browser tool bar).

The menu 200 may give the user the option of encrypting sensitive information 210, encrypting all information types 220 and/or individually selecting which types of information are to be encrypted 230. The sensitive information in option 210 may comprise information types that are predetermined to be sensitive (e.g., by a provider of the synchronization server 115). All information types in option 220 may comprise all information types selected by the user for synchronization across the computing devices 110a-110b. The user may select one of the three options in the menu 200 (e.g., by clicking on a corresponding radio button). In the example shown in FIG. 2, the user has selected option 230.

For option 230, the menu 200 may include a list of different information types. When the user selects option 230 (e.g., by clicking on the corresponding radio button), the user 105 may individually select which types of information are to be encrypted by checking a box next to each desired information type. In the example shown in FIG. 2, the user 105 has selected autofill data and passwords for encryption.

After the user 105 selects information types for encryption at one of the computing devices 110a-100c, the computing device 110a-110c updates its local security settings accordingly. For example, if the user 105 selects option 220, then the computing device 110a-110c updates its local security settings so that all updates sent to the server 115 are encrypted. If the user selects option 230, then the computing device 110a-110c updates its local security settings so that updates including the information types selected by the user 105 are encrypted.

The computing device 110a-110c may then generate an encryption status specifying the information types selected by the user 105 for encryption and send the encryption status to the server 115. The server 115 may store the encryption status in the user account and send the encryption status to the other computing devices 110a-110c. Upon receiving the encryption status from the server 115, each of the other computing devices 110a-110c may update its local security settings accordingly.

For example, if the user selects autofill data and passwords for encryption at one of the computing devices 110a-110c, then the computing device 110a-110c may update its security settings accordingly so that the computing device 110a-110c encrypts autofill data and password before sending them to the server 115. The computing device 110a-110c may also generate an encryption status specifying that autofill data and passwords are to be encrypted, and send the encryption status to the server 115. The server 115 may store the encryption status in the user account and send the encryption status to the other computing devices 110a-110c. Upon receiving the encryption status, each of the other computing devices 110a-110c may updates its local security settings accordingly so that each of the other computing devices encrypts autofill data and passwords before sending them to the server 115 for synchronization.

In one aspect, an update may include an unencrypted header indicating whether the changes in the update are encrypted. When a computing device receives an update from the server 115, the computing device 110a-110c may check the header to determine whether the changes in the update are encrypted. If the changes are encrypted, then the computing device 110a-110c may decrypt the changes and update its local copy of browser information according to the decrypted changes. If the changes are not encrypted, then the computing device 110a-110c may update its local copy of browser information according to the changes without performing decryption.

In one aspect, each computing device 110a-110c may be configured to generate a cryptographic key based on a passphrase using a key generation algorithm (e.g., by inputting the passphrase into a cryptographic hash function). The cryptographic key may comprise one key for both encrypting and decrypting. Alternatively, the cryptographic key may comprise separate encryption and decryption keys for encrypting and decrypting, respectively.

The passphrase may be a user-provided passphrase, which may be referred to as an explicit passphrase. The user may enter the same passphrase into each computing device 110a-110c using a keyboard and/or other input device so that each computing device 110a-110c generates the same cryptographic key.

Alternatively, the passphrase may be derived from the user's login information (e.g., login password and/or user name), which may be referred to as an implicit passphrase. Since the user 105 may log onto the server 115 at each computing device 110a-110c using the same login information, each computing device 110a-110c may be able to independently generate the same cryptographic key. The implicit passphrase may also be derived from other information that is common to each computing device so that each computing device can independently generate the same cryptographic key.

In one aspect, the user 105 may select whether the cryptographic key is to be generated based on an explicit passphrase or an implicit passphrase at one of the computing devices 110a-110c. If the user 105 selects an explicit passphrase, then the computing device 110a-110c may prompt the user 105 to enter a passphrase (e.g., using a keyboard). The computing device 110a-110c may then use the user-provided passphrase to generate the cryptographic key. If the user 105 selects an implicit passphrase, then the computing device 110a-110c may automatically generate the cryptographic key (e.g., based on the user's login information).

After the user 105 makes a selection, the computing device 110a-110c may generate an encryption status indicating the user's selection and send the encryption status to the server 115. The server 115 may store the encryption status in the user account and send the encryption status to the other computing device 110a-110c. Upon receiving the encryption status from the server 115, each of the other computing devices 110a-110c may update its security settings according to the received encryption status.

If the user selects an implicit passphrase for generating the cryptographic key, then each of the other computing devices 110a-110c may automatically generate its own cryptographic key (e.g., based on the user's login information stored locally on the computing device). After generating its own cryptographic key, each computing device 110a-110c may use its locally-generated cryptographic key to encrypt and decrypt updates used for synchronization.

If the user selects an explicit passphrase for generating the cryptographic key, then the user may have to individually enter the passphrase at each of the other computing devices 110a-110c so that each of the other computing devices can generate its own cryptographic key. In this case, each of the other computing devices 110a-110c may prompt the user to enter the passphrase when the user 105 uses the computing device 110a-110c.

If one of the other computing devices 110a-110c receives an encrypted update from the server 115 before the user 105 has entered the passphrase into the computing device 110a-110c, then the computing device may store the encrypted update in its local memory. When the user subsequently enters the passphrase into the computing device, the computing device may generate its cryptographic key. At this time, the computing device may decrypt the stored update using its locally-generated cryptographic key and update its local copy of the browser information according to the decrypted update.

Figure 3:
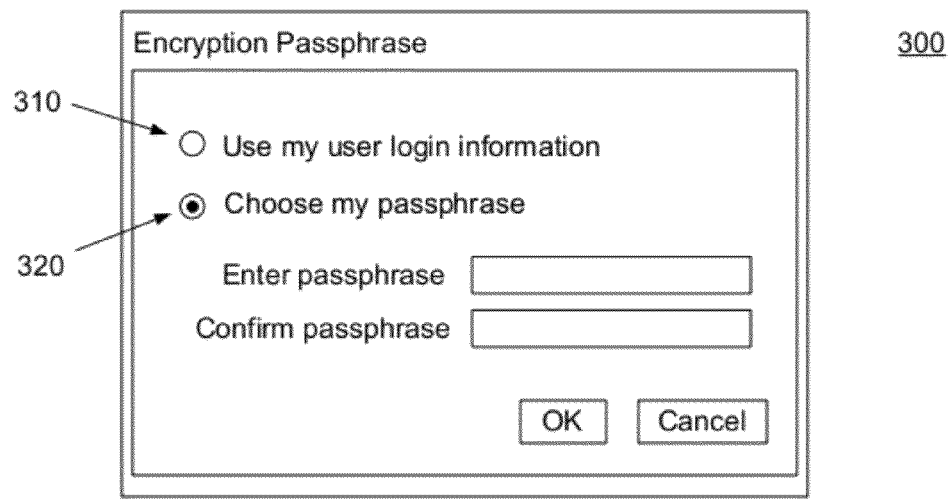
FIG. 3 is an exemplary screenshot showing a menu for selecting a type of passphrase for generating a cryptographic key according to an aspect of the subject technology.

FIG. 3 shows a screenshot of an exemplary menu 300 for allowing a user to select which type of passphrase is used to generate the cryptographic key according to an aspect of the subject technology. The menu 300 may be displayed at anyone of the computing devices 110a-110c. The menu 300 may be combined with the menu 200 in FIG. 2 so that the use can select both the type of passphrase and the types of information to be encrypted from a single menu.

The menu 300 may give the user the option of generating the cryptographic key based on an implicit passphrase (e.g., user login information) 310 or generating the cryptographic key based on a user-provided passphrase 320. In the example shown in FIG. 3, the user has selected option 320.

For option 320, the menu 300 may prompt the user to enter a passphrase twice into two input boxes. This is done to ensure that the user correctly enters the passphrase. If the user enters the same passphrase into both input boxes, then the computing device may generate the cryptographic key based on the passphrase. If the user enters different passphrases into the input boxes, then the computing device may infer that the user incorrectly entered the passphrase into one of the boxes and prompt the user to reenter the passphrase in at least one of the input boxes.

FIG. 4 shows a method 400 for synchronizing encryption of information across the computing devices 110a-110c according to an aspect of the subject technology. The method 400 may be performed by anyone of the computing devices 110a-110c.

In step 410, the computing device receives a selection of one or more types of information by the user 105. The one or more types of information selected by the user 105 may comprise a subset of the types of information that are synchronized across the computing devices 110a-110c.

In step 420, the computing device generates an encryption status indicating that the one or more types of information selected by the user 105 are to be encrypted. In step 430, the computing device sends the encryption status to the server 115 for distribution to each of the other computing devices 110a-110c. Each of the computing devices 110a-110c may update its security settings according to the encryption status. This way, the security settings of each computing device is synchronized with the user's selection.

FIG. 5 shows a method 500 for synchronizing encryption of information across the computing devices 110a-110c according to another aspect of the subject technology. The method 500 may be performed by anyone of the computing devices 110a-110c.

In step 510, the computing device receives an encryption status indicating one or more types of information selected by the user 105 at another one of the computing devices 110a-110c.

In step 520, the computing device identifies changes to information (e.g., browser information) corresponding to the one or more types of information indicated in the encryption status. For example, if the encryption status indicates bookmarks as a type of information selected by the user, then the computing device identifies changes to the bookmarks made at the computing device.

In step 530, the computing device encrypts the identified changes. For example, the computing device may encrypt the identified changes with the cryptographic key. In step 540, the computing device sends the encrypted changes to the server 115. The server may then send the encrypted changes to each of the other computing devices. Upon receiving the encrypted changes, each of the other computing devices may decrypt the encrypted changes and update its local information according to the decrypted changes. For example, if the decrypted changes include the addition of a new bookmark entry, then each of the other computing devices may updates its bookmarks to include the new bookmark entry.

Figure 6:
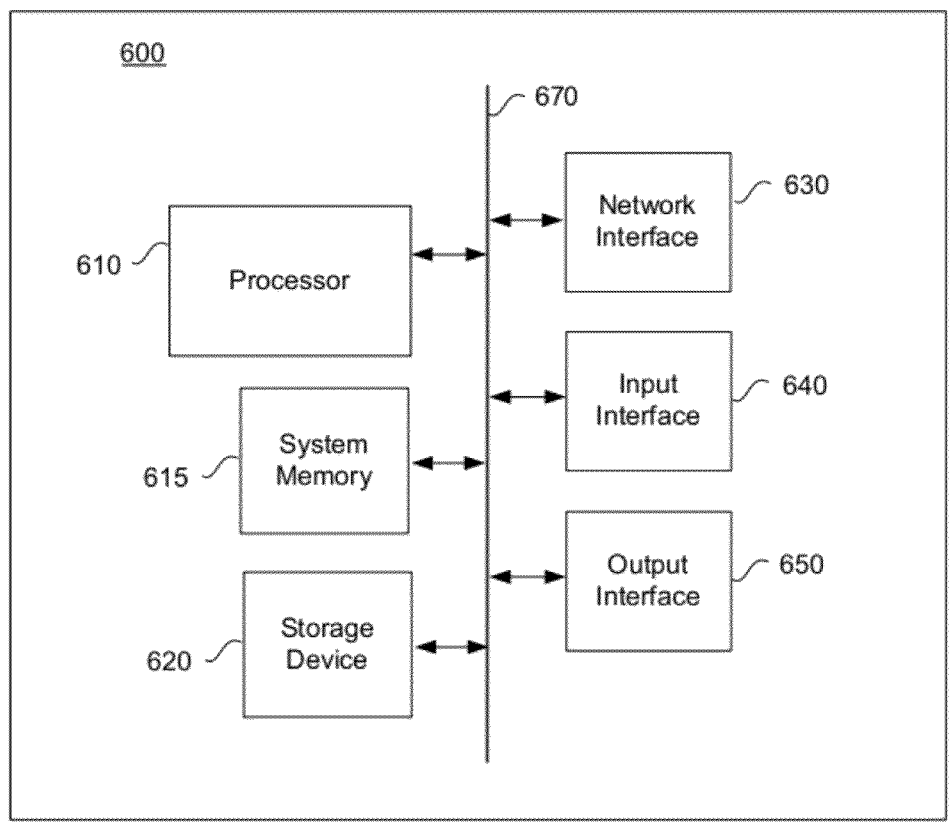
FIG. 6 conceptually illustrates an electronic system with which some implementations of the subject technology are implemented.

FIG. 6 conceptually illustrates an electronic system 600 with which some implementations of the subject technology are implemented. The electronic system 600 can be used to implement anyone of the computing devices 110a-110c shown in FIG. 1. While the electronic system 600 is shown in one configuration in FIG. 6, it is to be understood that the electronic system 600 may include additional, alternative and/or fewer components.

In the example shown in FIG. 6, the electronic system 600 includes a processor 610, system memory 615, a storage device 620, a network interface 630, an input interface 640, an output interface 650, and a bus 670. The bus 670 collectively represents all system, peripheral, and chipset buses that communicatively connect the numerous components of the electronic system 600. For instance, the bus 670 communicatively connects the processor 610 with the system memory 615 and the storage device 620. The processor 610 may retrieve instructions from one or more of these memories and execute the instructions to implement processes according to various aspects of the subject technology. The processor 610 may comprise a single processor or a multi-core processor in different implementations.

The storage device 620 may comprise a solid state drive, a magnetic disk, or an optical drive. The storage device 620 may be used to store an operating system (OS), programs, and/or files. The system memory 615 may comprise volatile memory (e.g., a random access memory (RAM)) for storing instructions and data that the processor 610 needs at runtime. Instructions for performing processes according to various aspects of the subject technology may be stored in the storage device 620 and loaded into the system memory 615 during runtime for execution by the processor 610. For example, a web browser application may be stored in the storage device 620 and loaded into the system memory 615 during runtime for execution by the processor 610. Also, the processor 610 may store local changes to the browser information in the system memory 615 and later write the local changes to the storage device 620 for long term storage of the changes. A local copy of the browser information may be stored in the system memory 615 and/or the storage device 620.

The network interface 630 enables the processor 610 to communicate with the server 115 over the network 125 (e.g., a local area network (LAN), a wide area network (WAN), an intranet, the Internet, etc.). The network interface 630 may include a wireless communication module for communicating with a base station or wireless access point 130 connected to the network 125 over a wireless link (WiFi wireless link, cellular wireless link, etc.).

The input interface 640 enables the user 105 to communicate information and commands to the processor 610. For example, the input interface 640 may be coupled to an alphanumeric keyboard and/or a pointing device (e.g., touch pad or mouse) to receive commands from the user 105.

The output interface 650 enables the processor 610 to communicate information to the user 105. For example, the output interface 650 may be coupled to a display (e.g., liquid crystal display (LCD)) and/or a printer to output information from the processor 610 to the user 105.

Many of the above-described features and applications may be implemented as a set of machine-readable instructions stored on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this disclosure, the term "software" and "program" is meant to include firmware or applications stored in a memory, which can be executed by a processor. Also, in some implementations, multiple software aspects can be implemented as sub-parts of a larger program while remaining distinct software aspects. In some implementations, multiple software aspects can also be implemented as separate programs. Finally, any combination of separate programs that together implement a software aspect described here is within the scope of the disclosure. In some implementations, the software programs, when installed to operate on one or more electronic systems, define one or more specific machine implementations that execute and perform the operations of the software programs.

A computer program (also known as a program, software, software application, script, or code) can be written in any form of programming language, including compiled or interpreted languages, declarative or procedural languages, and it can be deployed in any form, including as a stand alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The functions described above can be implemented in digital electronic circuitry, in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computers and storage devices can be interconnected through communication networks.

Some implementations include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media can store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, such as application specific integrated circuits (ASICs) or field programmable gate arrays (FPGAs). In some implementations, such integrated circuits execute instructions that are stored on the circuit itself. As used in this specification and any claims of this application, the terms "computer", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

It is understood that any specific order or hierarchy of steps in the processes disclosed is an illustration of exemplary approaches. Based upon design preferences, it is understood that the specific order or hierarchy of steps in the processes may be rearranged, or that all illustrated steps be performed. Some of the steps may be performed simultaneously. For example, in certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more.

A phrase such as an "aspect" does not imply that such aspect is essential to the subject technology or that such aspect applies to all configurations of the subject technology. A disclosure relating to an aspect may apply to all configurations, or one or more configurations. A phrase such as an aspect may refer to one or more aspects and vice versa. A phrase such as a "configuration" does not imply that such configuration is essential to the subject technology or that such configuration applies to all configurations of the subject technology. A disclosure relating to a configuration may apply to all configurations, or one or more configurations. A phrase such as a configuration may refer to one or more configurations and vice versa.

The word "exemplary" is used herein to mean "serving as an example or illustration." Any aspect or design described herein as "exemplary" is not necessarily to be construed as preferred or advantageous over other aspects or designs.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A computer-implemented method for synchronizing encryption of information, the method comprising:
   receiving a selection of one or more types of information by a user, wherein the one or more types of information are synchronized across a plurality of computing devices;
   generating an encryption status information indicating that the one or more types of information selected by the user are to be encrypted;
   sending the encryption status from a first one of the computing devices to a server, wherein the server distributes the encryption status to each of the other computing devices;
   receiving changes to information at the first computing device;
   determining whether the changes correspond to the one or more types of information selected by the user;
   if the changes correspond to the one or more types of information selected by the user, then performing the steps of:
      encrypting the changes with a cryptographic key; and
      sending the encrypted changes from the first computing device to the server, wherein the server distributes the encrypted changes to each of the other computing devices;
   receiving a selection of a type of passphrase by the user;
   generating a second encryption status indicating the type of passphrase selected by the user; and
   sending the second encryption status from the first computing device to the server, wherein the server distributes the second encryption status to each of the other computing devices.

2. The method of claim 1, wherein the one or more types of information comprise a subset of different types of information that are synchronized across the plurality of computing devices.

3. The method of claim 1, wherein the one or more types of information comprise at least one of bookmarks, browser preferences, themes, tabs, autofill data, and browser extensions.

4. The method of claim 1, wherein the type of passphrase is selected from the group consisting of an implicit passphrase and an explicit passphrase.

5. The method of claim 4, wherein, if the type of passphrase is the implicit passphrase, then performing the steps of
generating the cryptographic key based on second information at the first computing device.

6. The method of claim 5, wherein the second information comprises user login information used by the first computing device to log onto the server.

7. The method of claim 4, wherein, if the type of passphrase is the explicit passphrase, then performing the steps of:
receiving a passphrase provided to the first computing device by the user; and generating
the cryptographic key based on the user-provided passphrase.

8. A non-transitory machine-readable medium comprising instructions stored therein, which when executed by a machine, cause the machine to perform operations for encrypting information, the operations comprising:
receiving an encryption status at a first computing device, wherein the encryption status indicates one or more types of information selected by a user at a second computing device, and the one or more types of information are synchronized across the first and second computing devices;
identifying changes to information at the first computing device corresponding to the one or more types of information indicated in the encryption status;
encrypting the identified changes;
sending the encrypted changes from the first computing device to a server, wherein the server sends the encrypted changes to the second computing device;
receiving a second encryption status at the first computing device, wherein the second encryption status indicates a type of passphrase selected by the user at the second computing device; and
generating a cryptographic key based on the type of passphrase indicated in the second encryption status, wherein the generated cryptographic key is used to encrypt the identified changes.

9. The non-transitory machine-readable medium of claim 8, wherein the one or more types of information comprise a subset of different types of information that are synchronized across the first and second computing devices.

10. The non-transitory machine-readable medium of claim 8, wherein the one or more types of information comprise at least one of bookmarks, browser preferences, themes, tabs, autofill data, and browser extensions.

11. The non-transitory machine-readable medium of claim 8, wherein the type of passphrase is selected from the group consisting of an implicit passphrase and an explicit passphrase.

12. The non-transitory machine-readable medium of claim 11, wherein, if the type of passphrase is the implicit passphrase, then the cryptographic key is generated based on second information stored at the first computing device.

13. The non-transitory machine-readable medium of claim 12, wherein the second information comprises user login information used by the first computing device to log onto the server.

14. The non-transitory machine-readable medium of claim 11, wherein, if the type of passphrase is the explicit passphrase, then the operations further comprise receiving a passphrase provided to the first computing device by the user, and wherein the cryptographic key is generated based on the user-provided passphrase.

15. A system for encrypting information, the system comprising:
one or more processors; and
a machine-readable medium comprising instructions stored therein, which when executed by the one or more processors, cause the one or more processors to perform operations comprising:
receiving an encryption status at a first computing device, wherein the encryption status indicates one or more types of information selected by a user at a second computing device, and the one or more types of information are synchronized across the first and second computing devices;
receiving changes to information at the first computing device;
determining whether the changes correspond to the one or more types of information indicated in the encryption status;
if the changes correspond to the one or more types of information indicated in the encryption status, then performing the steps of:
encrypting the changes with a cryptographic key; and
sending the encrypted changes from the first computing device to the server, wherein the server sends the encrypted changes to the second computing device;
receiving a second encryption status at the first computing device, wherein the second encryption status indicates a type of passphrase selected by the user at the second computing device; and
generating the cryptographic key based on the type of passphrase indicated in the second encryption status.

16. The system of claim 15, wherein the one or more types of information comprise a subset of different types of information that are synchronized across the first and second computing devices.

17. The system of claim 15, wherein the one or more types of information comprise at least one of bookmarks, browser preferences, themes, tabs, autofill data, and browser extensions.

* * * * *